Sept. 12, 1950 S. E. JESSUP 2,522,229
PISTON
Filed Aug. 14, 1945
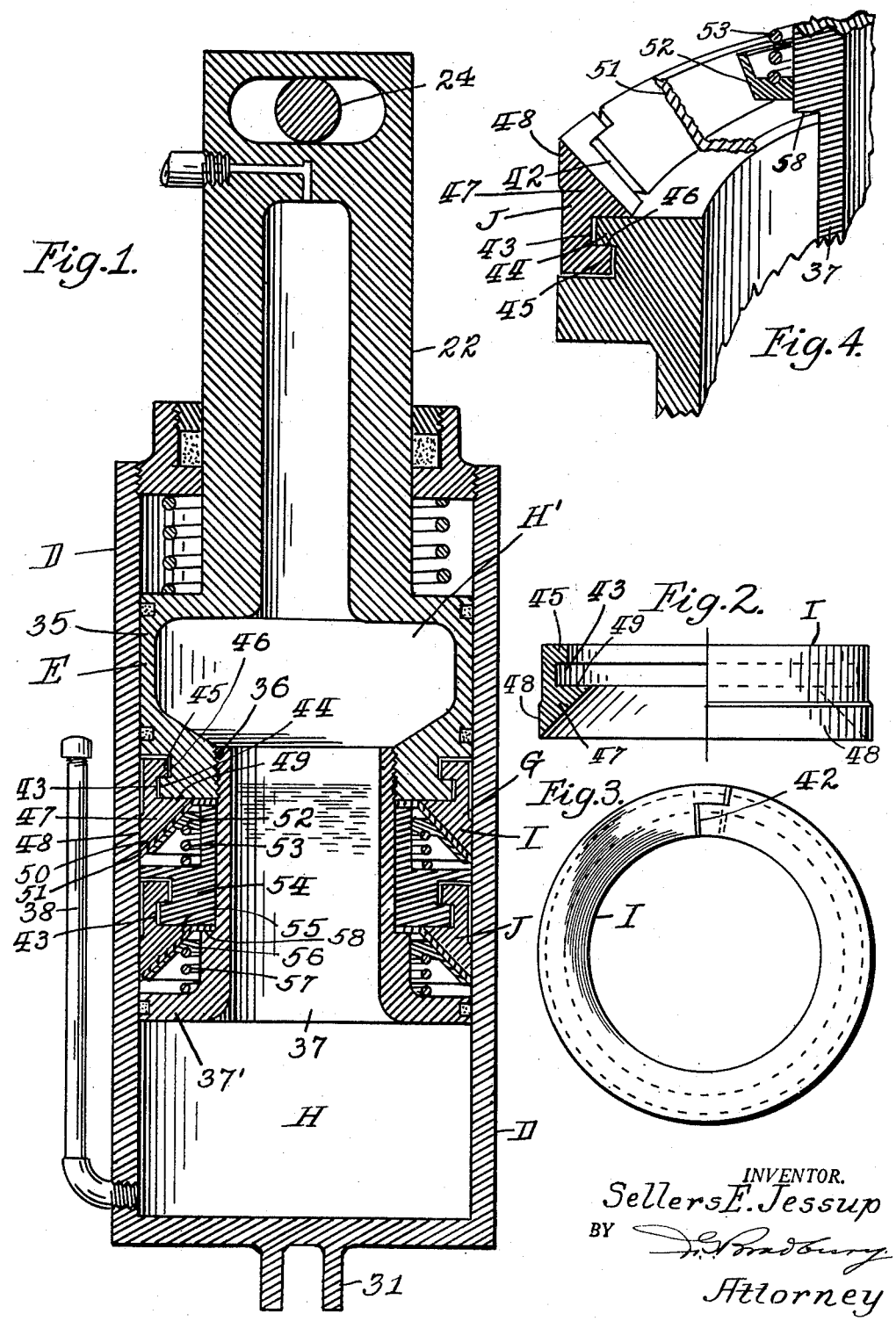
INVENTOR.
Sellers E. Jessup
BY
Attorney Patented Sept. 12, 1950

2,522,229

UNITED STATES PATENT OFFICE 2,522,229

PISTON

Sellers E. Jessup, Los Angeles, Calif.

Application August 14, 1945, Serial No. 610,701

3 Claims. (Cl. 309—34)

My invention relates to an improved piston which is particularly although not exclusively adapted to compensate supporting means for light and heavy loads on vehicles to equalize uneven distribution of weight on the running gear. Another object is to provide a piston and cooperating cylinder supporting couple which will absorb shocks and jars without leaking and whereby a load of substantially any weight can be supported by the use of compressible fluid without reduction in pressure over a long period of time. The invention has still further objects among which is the provision of a device of its kind which is simple in constructon, inexpensive to manufacture and positive in operation.

To these ends the invention comprises the features of construction and combination of parts hereinafter described and claimed.

In the accompanying drawing forming part of this specification, Fig. 1 is a vetrtical central section of a piston and cylinder couple showing my improvement when applied in use as a fluid actuated support for the usual body of a vehicle and its running gear; Fig. 2 is a side elevation, partly broken away, and in section of one of the improved piston rings shown in Fig. 1; Fig. 3 is a bottom plan of the piston ring shown in Fig. 2, and Fig. 4 is a cross section partly in perspective when inverted showing the end overlapping feature of the sealing means employed on the piston head.

Referring particularly to Fig. 1, my improvement is shown applied to a piston and cylinder couple, the piston E being adapted to reciprocate in the cylinder D, said piston being formed with an upwardly extended piston rod or stem 22 for attachment by a coupling pin 24 to a load (not shown), and the lower end of the cylinder being formed with flanged means 31 for attachment to the running gear (not shown) of a vehicle. The means for attaching these elements to the load and running gear may be of any suitable type and construction, the particular means employed not forming any part of the present improvement.

The piston E has a piston head 35, which as shown is integral with the lower end of the piston rod 22 and corresponds with the bore of the cylinder D and is freely reciprocable therein. The lower end portion of the piston head has coupled thereto by the threaded connection 36, a sleeve 37 which extends downwardly a suitable distance and terminates at its lower end in an outturned shoulder 37', which substantially corresponds in diameter with and freely reciprocates longitudinally in the bore of the cylinder so as to hold a composite unit G. This composite unit is of end actuated expansion type and is composed of piston rings I and J which are adapted to produce seal tight reciprocable connection between the contacting surfaces of the piston and cylinder walls. The type of rings employed substantially corresponds in construction with the type disclosed in my Patent No. 2,009,764, granted October 22, 1946.

The piston head and piston rod as shown in Fig. 1 are hollow and the chamber H therein thus formed unites the space below the piston head in the cylinder by the sleeve 37, thus forming a continuous chamber extending from the piston rod down into the lower end of the cylinder below the piston.

In use the lower end of chamber H is filled with liquid such as lubricating oil of predetermined volume by the supply duct 38 and the upper end of the chamber above the body of liquid is supplied with fluid, such as air, of predetermined pressure suitable to resiliently support any load including shocks and jars. This pressure of fluid also causes the liquid to lubricate the rings or other moving surfaces of the composite ring structure, thus forming a freely sealed piston and cylinder so as to support any pressure applied by the load without leaking. Since the volume of liquid is greater than the volume of air the moving parts cannot contact endwise under any load. There is always a floating piston in the cylinder and a resilient support for the load.

My improved composite unit G of end actuated expansion rings as shown in Fig. 1 is composed of two similar metallic packing rings I and J. It will be noted that by constructing all of the parts of the ring units out of mtallic material the device is not subject to deterioration by contact with lubricating medium and to heat or change in temperature, to which a device of this character is usually subjected. Each ring resembles an annulus which is split and formed with a suitable overlapping joint 42 (Figs. 3 and 4), to provide a tight connection. This lap joint permits the ring to expand or contract freely. The body of this annulus has an inner annular channel 43 to receive an annular radiating lock shoulder 44, which is formed on the lower end of the piston head, thus producing an inturned annular key shoulder 45 on the upper end of the ring and a corresponding annular groove 46 in which the key shoulder 45 overlaps, whereby an annular interlocking lap joint is produced between the ring and the piston head which retains the ring longitudinally on the piston. This means provides an interlocking connection for assisting in holding the ring in place on the piston and producing a tight joint. The forward or lower end of the ring is provided with a packing head 47 which has a broad outer side cylindrical bearing surface 48 normally pressing in sliding contact against the side cylindrical wall. The packing head also has a horizontal inwardly extending annular bearing surface 49 which overlaps inwardly in tight engagement over the lower end of the piston head. The packing head further is provided with an inwardly and upwardly beveled surface 50. Said side cylindrical bearing surface 48 is preferably a ground sliding fit against the inner cylindrical wall of the cylinder. Free clearance spaces between the ring and the piston head are provided to permit free expansion of the ring and tight sealing connections between the ring, cylinder and piston head. A packing plate 51 is placed over the joint between the tapering surface of the ring and the end of the cylinder head and a flexible inwardly and upwardly converging annular press plate 52 corresponding with the tapering contour of the seal 51 is placed against the latter. A coil helical spring 53 is impressed between the press plate and an adjoining end of a collar 54 which constitutes a supplemental annular piston section. Said collar closely conforms with and is in sliding connection with the outer cylindrical surface of the piston sleeve 37 and its annular body slides freely in contact with the bore of the cylinder D.

The body of the collar 54 is very similar to the lower end portion of the piston both on its outer side and lower end to receive and hold a supplemental piston ring J which is similar to the piston ring I. In like manner a flexible seal 55 is placed over the inwardly tapering surface of the ring and the joint between the ring and collar is held tightly impressed thereover by a press plate 56, the latter being held under compression by a supplemental coil spring 57. The two seal ring packing units thus formed are locked together by the annular shoulder 58 on sleeve 37 under compression to form the composite sealing unit G which produces a durable leak proof reciprocable connection between the piston and cylinder.

In use the device is charged with oil or other liquid and the feed duct 38 is sealed closed, the normal level of oil approximating that indicated in Fig. 1 and the volume thus supplied being maintained while the device is in service. Air or other compressible fluid under suitable pressure in accordance with the load to be supported is admitted into the portion H' of chamber H above the liquid and its volume is adjusted accordingly. The pneumatic supporting unit thus provided can be used for any purpose where it is desired to support a load. During these uses my improved composite sealing unit is adapted to support the load over long periods substantially without leaking.

Various modifications are contemplated within the spirit of the invention and within the scope of the following claims.

I claim:

1. Packing means for use in connection with a reciprocable piston and cylinder couple, comprising a sleeve on one end portion of the piston having an annular radiating shoulder on its outer end portion, a piston collar freely reciprocable on said sleeve, and packing ring units interposed between said collar and the end portions of said sleeve and piston, each of said units having an expansible piston ring bearing against the inner side wall of said cylinder, a spring interposed between said collar and one of said rings, and a second spring interposed between said shoulder and the other of said rings, said springs tending to expand said rings.

2. In a reciprocable piston and cylinder couple, a sleeve on one end portion of the piston having a radiating shoulder on its outer end portion, a collar on said sleeve between said piston and shoulder, and packing ring units interposed between said collar and the end portions of said piston and sleeve, each of said units having an expansible piston ring bearing against the inner side wall of said cylinder, packing medium overlying the inner surface of said ring and portions of said piston and sleeve, and pressure means for impressing the packing medium.

3. In a reciprocable piston and cylinder couple, a sleeve extended from the head end portion of the piston in said cylinder having a radiating shoulder on its extended portion, a collar engaged between the head end of said piston and the shoulder on said sleeve, and expansible packing ring units bearing radially against the inner surface of the cylinder and respectively longitudinally against the head end of the piston and the head end of said collar.

SELLERS E. JESSUP.

REFERENCES CITED

The following references are of record in the file of this patent:

UNITED STATES PATENTS

| Number | Name | Date |
|---|---|---|
| 1,066,712 | Cooper | July 8, 1913 |
| 1,990,798 | Richter et al. | Feb. 12, 1935 |
| 2,094,882 | Garnett et al. | Oct. 5, 1937 |
| 2,139,178 | Stevens | Dec. 6, 1938 |
| 2,322,010 | Fowler | June 15, 1943 |